United States Patent [19]
Vos et al.

[11] Patent Number: 6,002,588
[45] Date of Patent: Dec. 14, 1999

[54] THERMALLY CONDUCTIVE VIBRATION ISOLATORS

[75] Inventors: David L. Vos, Apalachin; Francis W. Hughto-Delzer, Endwell, both of N.Y.

[73] Assignee: Lockheed Martin Corporation, Bethesda, Md.

[21] Appl. No.: 08/984,813

[22] Filed: Dec. 4, 1997

[51] Int. Cl.⁶ .................................................. H05K 7/20
[52] U.S. Cl. ..................... 361/708; 174/138 G; 248/638; 361/685
[58] Field of Search ................................. 174/42, 138 G; 248/632–633, 636, 638; 361/685, 687, 704, 707–710

[56] References Cited

U.S. PATENT DOCUMENTS

| | | | |
|---|---|---|---|
| 4,292,225 | 9/1981 | Theodore et al. | 260/29.1 SB |
| 4,293,477 | 10/1981 | Theodore | 260/29.1 SB |
| 4,545,927 | 10/1985 | Railsback | 252/511 |
| 4,937,806 | 6/1990 | Babson et al. | 369/75.1 |
| 5,381,304 | 1/1995 | Theroux et al. | 361/706 |
| 5,399,432 | 3/1995 | Schleifstein et al. | 428/403 |
| 5,430,607 | 7/1995 | Smith | 361/707 |
| 5,570,270 | 10/1996 | Naedel et al. | 361/687 |

OTHER PUBLICATIONS

Audi "Cooling and Minimizing Temperature Gradient In Stacked Moduler" IBM Tech Disc. Bulletin, vol. 19, No. 2, Jul. 1976, p. 416, 361/716.

*Primary Examiner*—Gregory Thompson
*Attorney, Agent, or Firm*—Jack V. Musgrove; Andrew J. Dillon; Robert P. Cogan

[57] ABSTRACT

A method and construction for providing thermal management and vibration isolation to a component that requires a controlled temperature during operation. The component (e.g., a hard disk drive) is mounted within an enclosure such that the component is substantially isolated from mechanical vibrations, and the isolation mechanism further provides a thermal path from the component to the enclosure. An elastomeric article which supports the component may be attached to the interior of the enclosure, the elastomeric article being loaded with thermally conductive fillers (fibers or non-directional particulates molded within the elastomer material). Alternatively, a wire rope which supports the component may be attached to the interior of the enclosure, the wire rope having at least one support strand and at least one heat transfer strand that has a higher thermal conductivity than the support strand.

12 Claims, 2 Drawing Sheets

THERMALLY CONDUCTIVE VIBRATION ISOLATORS

BACKGROUND OF THE INVENTION

1. Field of the Invention

The present invention generally relates to the protection and thermal management of equipment, and more particularly to a method of providing shock and vibration isolation for components that also require temperature control.

2. Description of the Related Art

Electronic equipment is often very susceptible to changes in operating temperatures, particularly warm temperatures. Excessive temperatures not only can result in a change in the response characteristics of certain electrical devices (such as semiconductor devices), but can further damage such devices beyond repair. Thermal management of electronic equipment has become even more difficult with the increasing miniaturization of electronic devices.

Components for computer systems can be particularly sensitive to high temperatures. For example, a typical hard disk drive (which is used to provide permanent storage of data for a computer system) has one or more circular disks supporting a magnetic medium, and uses a solenoid coil (referred to as a voice coil or VC coil) to actuate one or more arm assemblies that carry electromagnetic transducers or heads that read from, or write to, the disk. During periods of extended use, the electrical signals passing through the wires of the VC coil heat it up, which can lead to various problems. For example, a change in coil temperature affects the resistivity of the wire and therefore changes the electromagnetic response of the VC. Excessive heating of the VCM coil can also result in overheating of other sensitive components of the hard disk drive (HDD).

HDDs are usually packaged in a modular enclosure so that they may be easily installed in and removed from the computer system. Hermetically sealed enclosures are often preferred since they provide protection against air borne contaminants, but these types of enclosures preclude meaningful air circulation around the disk, resulting in a dramatic temperature increase between the external cooling air and the disk surfaces. Some HDD enclosures are not totally sealed as they use "breather" filters which allow the pressure inside the enclosure to equilibrate with ambient pressure, such as where ambient pressure changes due to temperature or altitude, but breather filters do not allow any appreciable air flow. The problem of VCM coil cooling is further exacerbated by the increasingly diminutive size of HDD enclosures. Even techniques that provide some internal air flow within the enclosure still require transfer of excess heat from the enclosure to the outside air. Such heat transfer is typically provided by attaching some type of heat sink article to the exterior of the enclosure to provide improved thermal conductivity. Finally, ruggedizing commercial, off-the-shelf (COTS) disks require that the enclosure as designed be placed within another hermetic canister for protection from corrosive and caustic environments, such as condensing humidity, salt fog, airborne sand and dust, fuels and hydraulic fluids. This obviously compounds an already difficult thermal management problem.

Furthermore, electronic equipment is also often sensitive to minor impacts or intense vibrations which can affect moving parts of a component. Considering again the example of a hard disk drive, these units generally require enhanced shock and vibration isolation, especially for use in automotive, industrial, aerospace, and military environments. Excessive movement of the actuator assembly can result in a "crash" of the HDD, leading to critical loss of data. One type of shock and vibration isolator that is commonly used consists of an elastomeric element which is provided within the enclosure, i.e., the component is supported by the elastomeric element which is further attached to the interior of the enclosure. The other type of isolator that is most frequently used is a wire rope or cable mount. While these elements can achieve substantial isolation of the component from physical jarring, there is never complete protection from extreme impacts, so the term "isolation" should not be construed as connoting absolute suppression of mechanical vibrations or shocks.

Vibration isolation and thermal conductivity are mutually exclusive qualities in currently available computer mounting components. Due to the relative motion required between the hardware and its mounting surfaces for proper vibration isolation, thermal grounding techniques have been generally insufficient. Attempts have been made to implement an isolation system outside the hermetic enclosure, with snubbers and copper foil provided within the enclosure to enhance shock resistance and heat transfer, but this approach provides relatively poor thermal protection. It would, therefore, be desirable to provide a method of shock and vibration isolation that included an acceptable thermal path between a component and its enclosure. It would be further advantageous if the method did not require any additional parts, assemblies, or processes.

SUMMARY OF THE INVENTION

It is therefore one object of the present invention to provide a method of imparting shock and vibration isolation to electronic equipment, and particularly to computer components, which allows improved thermal management of the components.

It is yet another object of the present invention to provide a method of providing isolation and thermal management which does not significantly increase manufacturing costs and can be implemented in a wide range of products.

The foregoing objects are achieved in a device generally comprising an enclosure, an electronic component which generates heat during operation, and means for mounting the electronic component within the enclosure, the mounting means including means for substantially isolating the electronic component from mechanical vibrations which arise at sources outside the enclosure, and the mounting means further including means for transferring heat from the electronic component to the enclosure. The invention can be applied, for example, to a computer component such as a hard disk drive, wherein the enclosure is substantially sealed for protection against airborne contaminants. In one implementation, the mounting means includes at least one elastomeric article attached to an interior surface of the enclosure and supporting the electronic component, wherein the elastomeric article is comprised of an elastomer material loaded with thermally conductive fillers (fibers or non-directional particulates molded within the elastomer material). In a second implementation, the mounting means includes at least one wire rope attached to an interior surface of the enclosure and supporting the electronic component, wherein the wire rope is comprised of at least one support strand and at least one heat transfer strand having a thermal conductivity which is higher than the thermal conductivity of the support strand. The isolation mechanism provides a composite thermal conductivity of at least 120 W/mK, and more preferably provides a composite thermal conductivity of at least 237 W/mK. This novel approach results in improved ruggedization of equipment that is sensitive to both temperature and vibration boundary conditions, without additional parts or manufacturing processes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

The present invention is directed to a method of imparting shock and vibration isolation to an electronic component, wherein the isolation mechanism further provides adequate thermal management of the component. Improved thermal conductivity is afforded by making changes to the material used to fabricate shock and vibration isolators, to create an acceptable thermal path between the component and its enclosure. Conventional means may then be used to cool the exterior of the enclosure, for instance, by directing a fan to induce air flow about the enclosure.

In one implementation of the present invention, shock and vibration isolation is provided by elastomeric articles located within the enclosure, wherein the component is mounted on the elastomeric articles. The elastomer material of the articles is loaded with thermally conductive fillers to increase the overall composite thermal conductivity of the elastomers, to at least 0.3 W/mK, and preferably at least 10 W/mK. For example, various densities of thermally conductive fibers (e.g., aluminum, copper, or graphite) molded within the elastomers can provide a wide range of thermal and dynamic properties in response to specific application needs. Suitable elastomers include fluorosilicone, polyurethane, neoprene, etc. Although fibers provide the greatest improvements for thermal conductivity, non-directional particulates (e.g., alumina, boron nitride, or diamond dust) are also effective in enhancing thermal performance, and are easier to introduce into the molding process.

In a second implementation of the present invention, wire rope shock and vibration isolators are utilized wherein stainless steel cable strands are combined with various densities of higher thermal conductivity fibers or strands which similarly provide a wide range of thermal and dynamic properties. As with the first implementation, this approach provides an acceptable thermal path without compromising shock and vibration performance.

Figure 1:
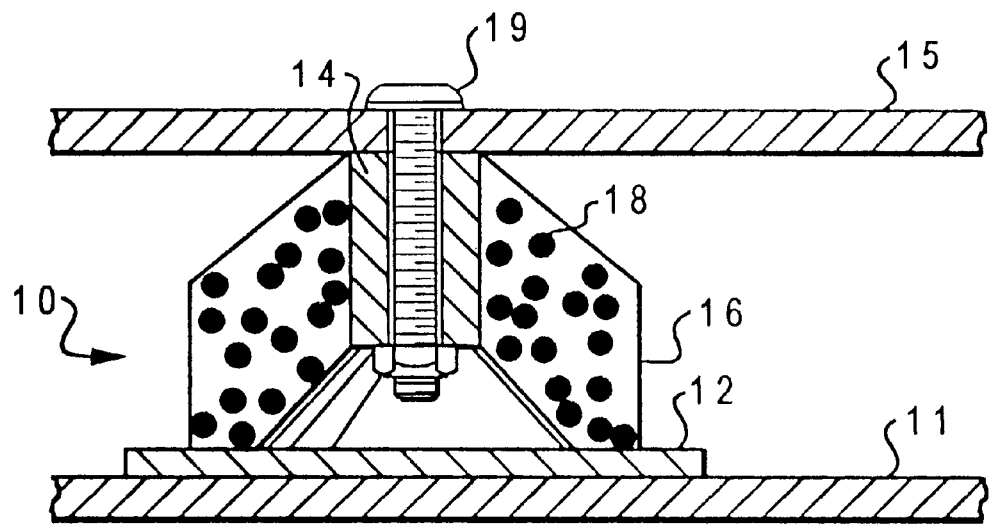
FIG. 1 is an elevational view shown in cross section of one embodiment of the present invention.

Various kinds of equipment can be fabricated according to the present invention. Referring now to the drawing wherein like numerals indicate like elements throughout and particularly FIG. 1 thereof, there is depicted one embodiment of a mounting apparatus 10 for an electronic device, such as a hard disk drive (HDD), constructed in accordance with the present invention. The isolator apparatus includes an isolator flange 12 and isolator hub 14, which are connected by an elastomeric article 16. The elastomeric article has a generally cylindrical shape with an axially extending aperture for receiving the isolator hub. In this embodiment, the elastomeric article 16 is filled with conductive particles 18. The mounting apparatus 10 provides the mounting attachment between the protective enclosure 11 and the commercially available HDD structure 15. Elastomeric articles 16 effectively isolate the HDD contents (i.e., spinning magnetic disks, actuator arm assembly, and control electronics) from vibrations that arise from sources outside the enclosure 11. Multiple mounting apparatuses can be used to secure a single electronic device within an enclosure.

Heat generated within the HDD is conducted from the structure of the HDD 15 to the isolator hub 14. The heat in turn passes from the isolator hub 14, through the elastomeric article 16, including the conductive particles 18, and into the isolator flange 12. Although other heat transfer mechanisms (such as radiation and free convection) are involved, inclusion of the conductive particles 18 in the elastomeric article 16 is substantially more efficient for heat transfer. The heat from the isolator flange 12 is then conducted to the protective enclosure which is ultimately cooled by means of conduction or convection. Isolator hub 14 is shown attached to the structure of the HDD by a fastener 19. Although various mounting configurations may be implemented (e.g., reversing the mounting apparatus 10 such that the isolator flange 12 attaches to the HDD structure 15 and the isolator hub 14 attaches to the protective enclosure 11, or attaching the HDD structure 15 directly to the protective enclosure 11 and locating the isolator apparatus outside the protective enclosure) the basic form and function of the mounting apparatus 10 remains unchanged as described herein.

Figure 2:
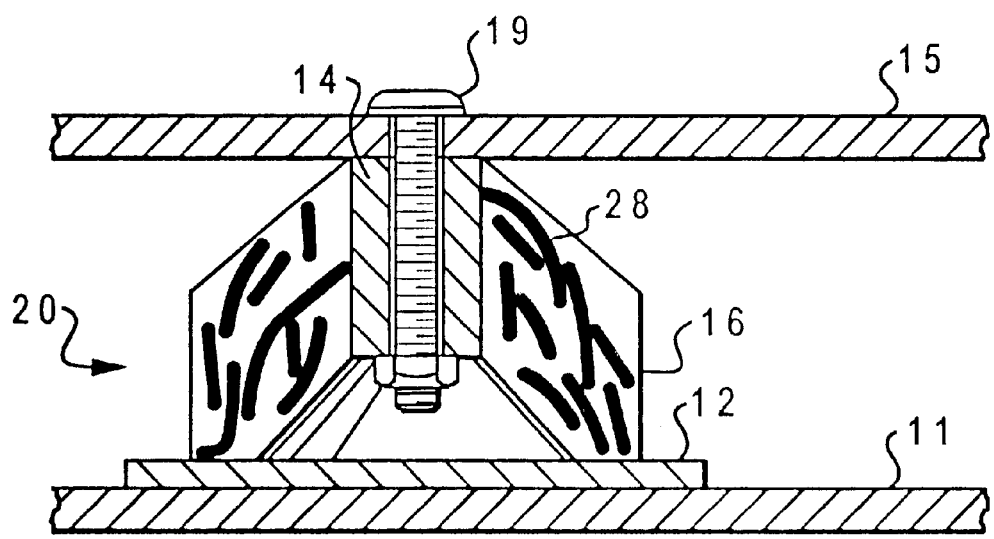
FIG. 2 is an elevational view shown in cross section of another embodiment of the present invention.

FIG. 2 depicts a similar embodiment 20 of a mounting apparatus constructed in accordance with the present invention. The isolator apparatus again includes an isolator flange 12 and isolator hub 14, which are connected by an elastomeric article 16. In this embodiment, the elastomeric article 26 is filled with conductive fibers 28. The mounting apparatus 20 again provides the mounting attachment between the protective enclosure 11 and the commercially available HDD structure 15, providing a heat sink as well as shock and vibration isolation. The elastomeric articles 16 can be attached to the hub and/or flange by any convenient method, including screws, conductive adhesives, or the inherent adhesive properties of the elastomeric materials during the casting/molding process.

Figure 3:
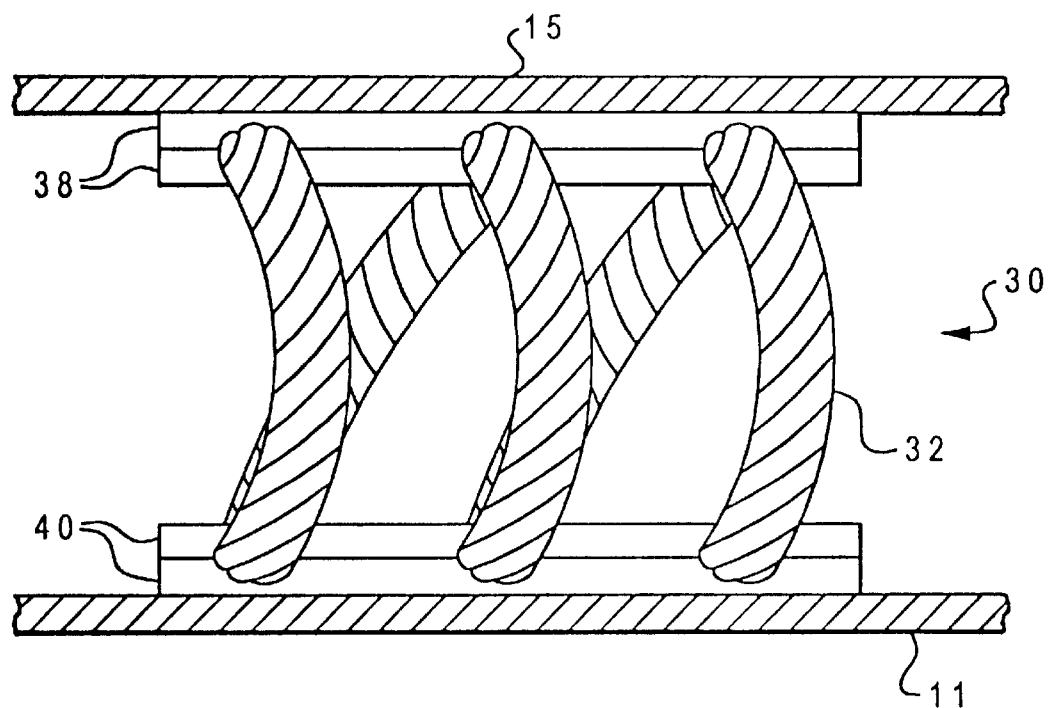
FIG. 3 is an elevational view shown partially in cross section yet another embodiment of the present invention.
Figure 4:
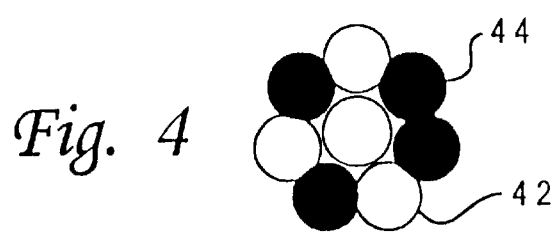
FIG. 4 is a cross sectional view of the rope shown in FIG. 3.

FIG. 3 depicts yet another embodiment 30 of a thermally conductive isolator constructed in accordance with the present invention. A high strength wire rope 32 suspends a mounting plate or bracket 15 of an electronic device (e.g., an HDD) from a frame or enclosure 11. Rope 32 is attached to bracket 15 using a set of bars 38 which is fastened or adhered onto bracket 15, with portions of rope 32 clamped between the set of bars 38. Another set of bars 40 is similarly used to secure portions of rope 32 to enclosure 11. As seen in FIG. 4, rope 32 includes interwoven high strength strands 42 and thermally conductive strands 44.

The present invention has several advantages over prior art constructions which attempt to provide vibration isolation and thermal management. The novel approach described herein to combining isolation and thermal conductivity results in improved ruggedization of equipment that is sensitive to both temperature and vibration boundary conditions. It achieves this improvement without additional parts or manufacturing processes, resulting in low assembly costs. The present invention further broadens potential markets for thermal/vibration sensitive hardware assemblies to include, e.g., laptop computers, avionics, automotive, and high vibration industrial electronics applications.

Vibration isolation and thermal control problems also arise with non-electronic devises. For example, internal combustion engines require vibration isolation and thermal control particularly when used in a confined area. Another example is temperature controlled environments where vibration isolation is required and exothermic or endothermic reactions, such as crystalline growth are taking place. The present invention does not rely on convection and is applicable to vacuum or zero gravity environments.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention might be applied to other computer components besides hard disk drives, such as floppy disks, CD ROM, DVD, COTS Power Supplies, and is further useful in non-computer applications. It is therefore contemplated that such modifications can be made without departing from the spirit or scope of the present invention as defined in the appended claims.

What is claimed is:

1. A device comprising:
    an object which generates a temperature differential during operation; and
    means for mounting said object, including means for substantially isolating said object from mechanical vibrations which arise at sources outside of said device, and said mounting means further including means for transferring heat between said object and the ambient environment, said mounting means including at least one elastomeric article loaded with thermally conductive fillers, an isolator flange attached to said elastomeric article, and an isolator hub attached to said elastomeric article.

2. The device of claim 1 wherein said means for transferring heat from said object has a composite thermal conductivity of at least 0.3 W/mK.

3. The device of claim 1 wherein said thermally conductive fillers are fibers molded within said elastomeric article.

4. A device comprising:
    an enclosure;
    an electronic component which generates heat during operation; and
    means for mounting said electronic component within said enclosure, said mounting means including means for substantially isolating said electronic component from mechanical vibrations which arise at sources outside of said enclosure, and said mounting means further including means for transferring heat from said electronic component to said enclosure, at least one elastomeric article loaded with thermally conductive fillers, an isolator flange attached to said elastomeric article, an isolator hub attached to said elastomeric article, and means for fastening said isolator hub to said enclosure.

5. The device of claim 4 wherein said enclosure is substantially sealed for protection against airborne contaminants.

6. The device of claim 4 wherein said electronic component is a hard disk drive or similar computer media device adapted to store data for a computer system.

7. The device of claim 4 wherein said means for transferring heat from said electronic component to said enclosure has a composite thermal conductivity of at least 0.3 W/mK.

8. The device of claim 5 wherein said thermally conductive fillers are fibers molded within said elastomeric article.

9. A method of assembling equipment, comprising the step of mounting a component within an enclosure, wherein the component generates heat during operation, the mounting step substantially isolating the component from mechanical vibrations which arise at sources outside of the enclosure, and said mounting step further creating a thermal path between the component and the enclosure, said mounting step including the step of attaching at least one elastomeric article to an interior surface of the enclosure using an isolator flange, attaching an isolator hub to the elastomeric article, and fastening the isolator hub to the component.

10. The method of claim 9 further comprising the step of substantially sealing the enclosure for protection against airborne contaminants, after said mounting step.

11. The method of claim 9 wherein said mounting step creates a composite thermal path having a composite thermal conductivity of at least 0.3 W/mK.

12. The method of claim 9 further comprising the step of loading an elastomer material with thermally conductive fillers to fabricate the elastomeric article.

* * * * *